United States Patent [19]

Dacons et al.

[11] 3,886,173

[45] May 27, 1975

[54] SUBSTITUTED HEXANITROBIPHENYLS

[75] Inventors: Joseph C. Dacons, Washington, D.C.; Horst G. Adolph; Mortimer J. Kamlet, both of Silver Spring, Md.

[73] Assignee: The United States of America as represented by the Secretary of the Navy, Washington, D.C.

[22] Filed: Dec. 30, 1963

[21] Appl. No.: 334,667

[52] U.S. Cl............. 260/296 R; 260/581; 260/646; 149/92; 149/105
[51] Int. Cl. . C07d 31/40; C07c 85/06; C07c 79/12
[58] Field of Search .......... 260/646, 578, 581, 297, 260/296 R; 149/105

[56] References Cited
OTHER PUBLICATIONS

Mascarelli et al., Chem. Abs., Vol. 26, p. 4809, (1932).
Vajda et al., Chem. Abs., Vol. 55, p. 16547, (1961).
Dacons et al., Chem. Abs., Vol. 69, p. 8625, (1963).

*Primary Examiner*—Leland A. Sebastian

EXEMPLARY CLAIM

1. The compound which is the dipyridinium salt of dipicric acid.
2. The compound 3,3'-dichloro-2,2',4,4',6,6'-hexanitrobiphenyl.
3. The compound 3,3'-diamino-2,2',4,4',6,6'-hexanitrobiphenyl.
4. The method of preparing the compound of claim 3 which comprises:
   a. forming the dipyridinium salt of dipicric acid by reacting dipicric acid with pyridine,
   b. reacting the said salt so formed with phosphorus oxychloride to produce 3,3'-dichloro-2,2',4,4',6,6'-hexanitrobiphenyl, and
   c. aminating said 3,3'-dichloro-2,2',4,4',6,6'-hexanitrobiphenyl and recovering the resulting product.

4 Claims, No Drawings

SUBSTITUTED HEXANITROBIPHENYLS

The invention described herein may be manufactured and used by or for the Government of the United States of America for governmental purposes without the payment of any royalties thereon or therefor.

This invention relates to a novel, thermally stable explosive compound and the preparation thereof. More particularly, the invention is directed to the preparation of 3,3'-diamino-2,2',4,4',6,6'-hexanitrobiphenyl.

Phenylbenzene is a very stable, normally solid compound having a melting point of 71°C which is used in industry as a heat exchanger. It does not have sufficient energy, however, to qualify as an explosive substance. A derivative thereof, hexanitrobiphenyl, is a known explosive but melts at too low a temperature to be useful as a temperature resistant explosive since it becomes liquid at about 240°C.

It has now been found that the addition of amino groups to the hexanitrobiphenyl molecule adds sufficient energy to the crystal lattice to raise the melting point of the resulting compound to the point where a thermally stable explosive is obtained.

Accordingly, it has been found that aminated hexanitrobiphenyl may be prepared by a synthesis utilizing dipicric acid (3,3'-dihydroxy-2,2',4,4',6,6'-hexanitrobiphenyl) as a starting material. In general, the synthesis involves conversion of dipicric acid to its dipyridinium salt, the conversion of the salt to dipicryl chloride and finally the conversion of dipicryl chloride to 3,3'-diamino-2,2',4,4',-6,6'-hexanitrobiphenyl.

The following examples are given to illustrate a specific embodiment of the invention.

EXAMPLE I

Preparation of the Dipyridinium Salt of Dipicric Acid

A solution was made by dissolving 150 g of dipicric acid in 1,500 ml of warm absolute methanol. The solution was then cooled to below 40°C and 75 ml of pyridine was added, in a slow stream, with vigorous stirring. Stirring was continued for about ½ hour after the addition was complete. The reaction mixture was then cooled in an ice-salt bath, filtered and the product was washed with ether and dried. The yield was 183 g (90.6% of theoretical) of a bright yellow solid, m.p. 256°–258°C.

EXAMPLE II

Preparation of Dipicryl Chloride

The dipyridinium salt of Example I (118 g) was added to 236 ml of phosphorus oxychloride and the mixture was warmed on a steam bath. The salt was nearly completely dissolved when the temperature reached 60°C, at which time the product began to precipitate. After heating for an additional ½ hour, the reaction mixture was cooled to below 40°C and drowned slowly, starting with 500 ml water and adding the reaction mixture and ice at a rate sufficient to keep the drowning mixture at about 30°C. (CAUTION: The method of drowning is critical if loss of product is to be avoided. If the reaction mixture is added to ice or an ice-water mixture the reaction is initially quite slow but as the ice melts the reaction rate increases and undergoes autoacceleration which may yield to boiling and splattering.) When drowning was complete, the volume was 2,000–2,500 ml. Upon cessation of the exotherm the product was recovered by filtration and washed with 2 liters of cold water. The product was then suspended in 500 ml of methanol, warmed almost to the boiling point with stirring, filtered and dried. The yield was 94 g (99.5% of theoretical), m.p. 275°–277°C.

EXAMPLE III

Preparation of 3,3'-diamino-2,2',4,4',6,6'-hexanitrobiphenyl

To 2,200 ml of absolute methanol saturated with dry ammonia there was added portionwise over a one-hour period, at a temperature below about 12°C, 226 g of dipicryl chloride. The dipicryl chloride dissolved as added to form a blood-red solution. Anhydrous ammonia was then slowly bubbled in for an additional 15 minutes after which time the solution was slowly heated to reflux. At about 30°–35°C an orange solid began to precipitate and the solution lightened in color. The mixture was then refluxed for ½ hour, after which time about 500 ml ethanol had boiled off carrying with it any excess ammonia.

The reaction mixture was then cooled to 10°C, filtered and the product was washed with 3% aqueous HCl, ethanol and ether and dried in a vacuum oven at 80°C. There was obtained 197.5 g (95%) of an orange-brown powder which upon recrystallization took the form of a microcrystalline yellow powder, m.p. 305°–306°C. The product was analyzed as 3,3'-diamino-2,2',4,4',6,6'-hexanitrobiphenyl. It has the molecular formula $C_{12}H_6N_8O_{12}$ and has a molecular weight of 454.1.

The temperature range may vary from that given in the preceding examples although ordinary precautions must be taken in order to prevent uncontrollable exotherms.

As solvents, alcohols other than methanol and ethanol may be used and other classes of compounds may be used as solvents such as, for example, aliphatic and aromatic hydrocarbons, tetrahydrofuran and dioxane.

As aminating agents there may be used aqueaus ammonia, ammonium salts such as ammonium acetate and, in fact, any material which will generate ammonia.

Since 3,3'-diamino-2,2',4,4',6,6'-hexanitrobiphenyl is stable and nonvolatile at advanced temperatures and reduced pressures and will propagate detonation in relatively small diameters it may be used in mild detonating fuse which acts as detonating cord for missile stage separation.

Obviously many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. The compound which is the dipyridinium salt of dipicric acid.
2. The compound 3,3'-dichloro-2,2',4,4',6,6'-hexanitrobiphenyl.
3. The compound 3,3'-diamino-2,2',4,4',6,6'-hexanitrobiphenyl.
4. The method of preparing the compound of claim 3 which comprises:
   a. forming the dipyridinium salt of dipicric acid by reacting dipicric acid with pyridine,
   b. reacting the said salt so formed with phosphorus oxychloride to produce 3,3'-dichloro-2,2',4,4',6,6'-hexanitrobiphenyl, and
   c. aminating said 3,3'-dichloro-2,2',4,4',6,6'-hexanitrobiphenyl and recovering the resulting product.

* * * * *